United States Patent [19]
Hardy et al.

[11] Patent Number: 6,073,242
[45] Date of Patent: Jun. 6, 2000

[54] ELECTRONIC AUTHORITY SERVER

[75] Inventors: Ann Ewing Hardy, Palo Alto; Norman Hardy, Portola Valley; E. Dean Tribble, Los Altos Hills, all of Calif.

[73] Assignee: Agorics, Inc., Los Altos, Calif.

[21] Appl. No.: 09/044,607

[22] Filed: Mar. 19, 1998

[51] Int. Cl.⁷ .................................................. G09C 3/08
[52] U.S. Cl. .......................... 713/201; 713/151; 713/155; 380/255; 380/258
[58] Field of Search ................................... 380/255, 258; 713/151, 155, 156, 161, 168, 169, 170, 201

[56] References Cited

U.S. PATENT DOCUMENTS

| | | | |
|---|---|---|---|
| 4,584,639 | 4/1986 | Hardy | 364/200 |
| 4,847,890 | 7/1989 | Solomon et al. | 379/67 |
| 4,961,224 | 10/1990 | Yung | 380/25 |
| 4,962,449 | 10/1990 | Schlesinger | 395/186 |
| 4,962,532 | 10/1990 | Kasiraj et al. | 380/25 |

OTHER PUBLICATIONS

"Applied Cryptography: Protocols, Algorithms, and Source Code in C", Bruce Schneier, Chapters 17–22 and 24, 1996, ISBN 0471–117099.

"Generalized Certificates", Carl Ellison, Feb. 29, 1996, 11 pages, website url:http;www.clark.net/pub/cme/html/cert.html.

"Joule: Distributed Application Foundations", Agorics, Inc., Los Altos CA Agorics Technical Report Add003.4P, 119 pages, Nov. 4, 1994 DRAFT.

"Capability– and Object–Based System Concepts", Henry Levy, 18 pages, 1984, Digital Press/Digital Equipment Corporation, Bedford MA.

*Primary Examiner*—Thomas R. Peeso
*Attorney, Agent, or Firm*—Steven F. Caserza; Flehr, Hohbach Test Albritton & Herbert, LLP

[57] ABSTRACT

An electronic communication authority server that provides centralized key management, implementation of role-based enterprise policies and workflow and projection of corporate authorities over trusted networks. The authority server includes a key database that associates keys, signatures and indicators of corporate authority (such as letterhead) with particular corporate roles. There can be multiple roles or a single role (e.g., employee) for each authority server. Users associated with one or more roles are permitted by the authority server to exercise authority or include the indicators of authority in their communications. The authority server also encrypts/decrypts and signs/verifies communications from/to a user using the keys and signatures associated with the role being exercised by the user for that communication. The authority server permits roles to be delegated or transferred, which facilitates the execution by the authority server of role-dependent workflow procedures. In another embodiment, keys are not associated with individual roles but with servers and/or groups of users. In this embodiment a server processes a request from one of its users in accordance with the role-based policies it embodies and then, if necessary, indicates the identity of the requesting user in the end product of the request, which it then signs using its own key and encrypts with appropriate destination keys.

54 Claims, 7 Drawing Sheets

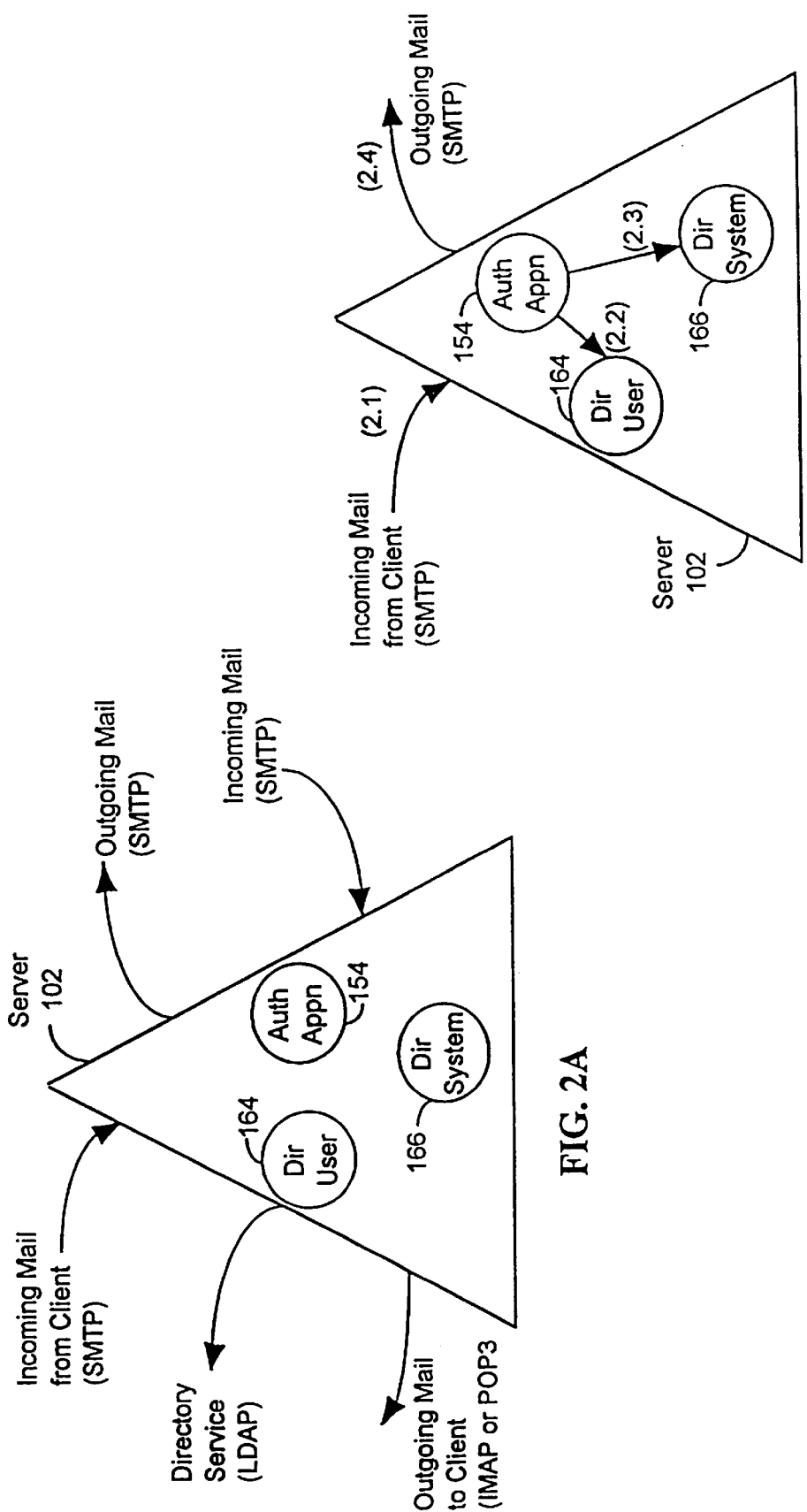

Client Memory 208

| | |
|---|---|
| Programs | |
| Operating System | 210 |
| SMTP Client | 212 |
| IMAP Client | 214 |
| POP3 Client | 216 |
| Crypto Systems (opt.) | 218 |
| Porthole | 220 |
| User Applications | 222 |
| Directory Service (opt.) | 224 |
| Data Structures: | 226 |
| Keys (opt) | 230 |
| Roles (opt) | 232 |
| Rules (opt.) | 234 |
| User Directory Info (opt.) | 236 |
| | 238 |

Server Memory 148

| | |
|---|---|
| Programs | |
| Operating System | 150 |
| Authority Server | 152 |
| SMTP Host | 154 |
| IMAP Host | 156 |
| POP3 Host | 158 |
| Crypto Systems | 160 |
| DirUser | 162 |
| DirSystem | 164 |
| Portholes | 166 |
| Policy Applications | 168 |
| Information Manager | 170 |
| Data Structures: | 172 |
| Keys (opt.) | 180 |
| Roles (opt.) | 182 |
| Rules (opt.) | 186 |
| Queues | 188 |
| Low Level Connect. Info | 190 |
| User Directory Info | 192 |
| | 194 |

FIG. 3

Rules Database 188

| | |
|---|---|
| Rules on formatting/generating communications | 202 |
| Rules for Signing/Authorization | 204 |
| Policies regarding execution of workflow transactions | 206 |
| Rules for Encryption | 208 |
| Rules governing transfer and delegation of roles/authorities: | 210 |
|    When a user can delegate at least part of their auth/role to another | 210a |
|    When a user can transfer an auth/role from a second party to a third party | 210b |
|    When a user can revoke or delegate an auth/role held by another | 210c |
|    When a new user can be assigned an auth/role | 210d |
|    When a user can set policies for automatic delegation of their auth/role | 210e |
|    When a use can create a limited version of an authority | 210f |
| Logging rules | 212 |
| Monitoring rules | 214 |
| Rules governing the creating of keys and roles databases | 216 |

FIG. 6

ELECTRONIC AUTHORITY SERVER

The present invention relates generally to electronic transactions and, particularly, to systems and methods for providing secure electronic transactions.

BACKGROUND OF THE INVENTION

With the explosion in the use of computer networks for electronic communications/transactions there is a growing need for systems that render such communications/transactions secure and authenticatable. The state of the art is to build network security on the foundation of a conventional Public Key Infrastructure (PKI), where each communication or transaction is encrypted, and/or authenticated. For example, in order to ensure that only Bob will be able to decipher a message, Alice encrypts the message with Bob's public encryption key. Only Bob's private decryption key can reveal the contents of a message encrypted with Bob's public encryption key. Similarly, in order to provide assurance to Bob that a message came from Alice, Alice signs the message with her private signing key. Since Alice's public signature verification key shows the message to be unmodified, Alice's private signing key must have been used to produce the signature.

Public key cryptography is effective when used by a small number of parties, but when used on a network-wide basis, as in conventional PKI, it quickly becomes unwieldy due to key management issues. Due to its scaling problems, it would be difficult to use conventional PKI to support a broad range of electronic communications applications and transactions, including financial transactions, workflow applications, electronic sales, online insurance, and database transactions. Some shortcomings of conventional PKI are now described in the context of e-mail, which is the quintessential electronic communication application and representative of the broader class of electronic transactions.

Most current electronic mail (hereinafter, "e-mail") (or other electronic communication) technology adheres to an end to end paradigm in which one user sends an electronic message directly to another user without significant intervention by other computers or agencies in the delivery path. In many such systems a user can encrypt, decrypt or sign a message; or verify an electronic signature using encryption software (such as PGP or S/MIME) running on the client or the server. In the latter situation the server performs cryptographic functions for a user using key/signature information (private keys of the user and public keys of his correspondents) maintained for the individual on the server and then routes the message to either an input or output mail queue as appropriate. In contrast, when the client performs the cryptographic functions, the server performs only the message routing functions. As a result of the server's minimal involvement in e-mail processing, corporate policies (such as who can represent the corporation in which matters and who is entitled to use which badges of corporate authority) are difficult to implement at the server level.

For example, it would be useful for a company president to be able to use the electronic equivalents of paper processes to issue official corporate statements. For such statements to be trusted inside or outside the company, no other employee should be able to misrepresent herself as the president and anyone receiving the official e-mail should be able to authenticate the message as coming from the president on behalf of the company. Ideally, this authentication would be provided by the e-mail server, or some other centralized server. However, this is not presently possible in conventional e-mail systems, in which users can represent themselves in any manner and, generally, there is a lack of trusted/authoritative e-mail connections between e-mail servers.

The president might also want to send e-mail in an individual capacity (to a friend, for example) or as a corporate employee (e.g., when posing an insurance benefits question). It would be desirable for the president to issue such messages without representing herself as president, but as one of her other roles (e.g., individual or employee). However, because conventional e-mail systems are individual user-oriented, it would be difficult for corporate e-mail systems to take into account the corporate roles (e.g, President, Vice President, CFO, manager, exempt employee, non-exempt employee, check signer, etc.) of e-mail users. Because most corporate policies are role-based rather than individual-based (e.g., all check requests for more than ten thousand dollars must be signed by the CFO, only the President can use "From the desk of the President" letterhead etc.) this orientation further frustrates the ability of conventional e-mail systems to implement corporate policies. This lack of a role-based e-mail infrastructure also prevents the various authorities of the corporation from being projected internally or externally via e-mail or other communication medium.

Moreover, the focus of current encrypted E-mail products on support for the individual user complicates key management. For example, given that many individual users will have their own unique keys for each different encryption system (e.g. PGP, S/MIME, etc.) and the keys for all external contacts, thedirectory for a corporate e-mail service might need to keep track of tens of thousands of keys. The current products provide little support for maintaining or updating this database as correspondents change their addresses, update their software, or replace their keys, particularly across corporate boundaries.

Additionally, even if encrypted e-mail systems were somehow modified to account for roles, their decentralized (i.e., client-oriented) nature would prevent roles from being easily transferred or delegated, for example, delegating the authority of the president when the president is on vacation or temporary authority to a customer to access the relevant set of help files or transferring the authority of president to a new person. This lack of role support in encrypted e-mail systems is also a barrier to implementing secure workflow processing in the corporate e-mail server, where, for example, a travel request might need to be signed off on by one or two supervisors depending on the cost of travel and, in the absence of one or two of the required signers, by the CFO. Moreover, another problem with current encrypted email systems is accurate revocation. For example, in such systems it would be possible for a company to revoke the president's key (e.g., after she quit), delegitimizing encrypted e-mail legitimately sent by the president before she quit (assuming the company also sent out notices to all correspondents that the president had quit). Alternatively, it would be possible for the ex-president to keep using the president's key long after leaving the company.

Thus, the end to end paradigm of conventional e-mail prevents the effective use of e-mail in a corporate context in at least seven ways: (1) it frustrates corporate control over how users represent themselves, (2) it does not support an environment in which the corporate authority wielded by an employee/user is determined by his corporate role and not his individual identity, (3) it does not support an environment in which an employee can have multiple simultaneous roles (4), it does not support the delegation or transfer of authorities, (5) it complicates encryption and key management (for example, key revocation-when a key is compromised or has expired, key update-when a key is replaced, and key distribution), and (6) it complicates workflow processing and (7) it allows keys to be used after revocation indistinguishably from their use at approved times (i.e., it provides no information about which action taken by a revoked key are valid and which are invalid).

It is therefore an objective of the present invention to provide an alternative to prior art conventional PKI systems and an e-mail application in it that supports: (1) corporate control over how users represent themselves, (2) an environment in which the corporate authority wielded by an employee/user is determined by his corporate role and not his individual identity, (3) an environment in which an employee can have multiple simultaneous roles, (4), the delegation and transfer of authorities, (5) simplified encryption and key management, (6) simplified workflow processing and (7)prompt revocation of authorities (eliminating the need for receiver online verification of authority).

SUMMARY OF THE INVENTION

In summary, the present invention is an authority server that supports the implementation of role-based enterprise policies for expressing and exercising authority and the projection and transfer of those authorities over networks of communicating electronic systems.

A key aspect of the present invention is that the authority server exclusively embodies the authorities of the enterprise and allows its users to indirectly wield those authorities only as permitted by enterprise policies. By only allowing the authority of the enterprise to be wielded indirectly, the present invention can monitor and control representations by a user of his role and/or authority and can limit actions taken by a user to those within the scope of the user's authority. For example, an insurance company authority server might only allow users with underwriting authority to issue an insurance binder online. The present invention can also promptly revoke authorities (eliminating the need for receiver verification of authority) and audit invocation of authority. As a result, the present invention is well-suited to implement the equivalents of paper processes, such as letterhead, in networked computer systems.

In particular, the present invention includes an authority server coupled to one or more clients or other servers via secure connections (i.e., connections supporting confidentiality, authenticity and integrity). Each client can be used by at least one user, each with their own name, roles, (e.g., employee, CFO, President), authorities (e.g., special authorities such as system administration or check signing, or default authorities associated with their role), and each uniquely identifiable to the server.

In this context, a secure connection is a connection where the level of confidentiality, authentication, and integrity is sufficient for the purposes of the system owners and users. Standard mechanisms for confidentiality include:

Admonition by corporate policy (e.g., violators will be terminated);
Shared key encryption (DES, etc.);
Public key encryption through SSL, TLS, etc.;
Dedicated hardware links;
Secure routing;
Capability infrastructure.

Standard mechanisms for authentication include:
Password-based authentication;
Public-key or certificate-based signature verification;
Smart card-based authentication;
Capability infrastructure;
integration with external security infrastructure such as Kerberos, PAM (Plugable Authentication Modules), and ad hoc user databases.

Similar standard mechanisms exist for integrity assurances, particularly in the context of confidential, authenticated channels.

Over their secure, authenticated connections, clients can request that a specific authority be applied to their communication. Based on the authority associated or delegated to the user in the authority server and the policies established in the server's configuration, the server can then invoke appropriate authorities on behalf of the user, while enforcing enterprise policy (such as logging) on the invocations of those authorities.

To support scalability within an enterprise, or communication between cooperating businesses, the authority server can be coupled to other similar servers via secure network connections.

Each server contains a private system directory mapping from authority references (names, for example) to representations necessary to invoke or project that authority. These representations may include:

objects provided by the implementation platform (Java objects, KeyKOS keys, etc.); and
information used to represent that server's authorities to an appropriate third party, such as:
user name and password—to invoke a stored database procedure or log into a UNIX-based service;
Kerberos tickets;
symmetric keys (for encryption such as DES) shared with the destination;
keys or certificates for standard public-key encryption;
routing information (host, port number, routes, domain); and
a procedure whose execution invokes the authority— for example, engaging in challenge/response authorization using some of the above information.

The system directory can also specify what cryptography type and key are to be used to verify information from a particular external correspondent or to encrypt information to particular external destination.

Because the policies of the authority server control under what circumstances each authority will be invoked, the same authority representation (public key, password, etc.) can be used for requests by all users. The users never have direct access, and so changes in policy are immediately reflected in the authorities that every user could invoke or project.

In the preferred embodiment, the server also provides a per user view using standard directory-service access methods such as LDAP for the authority and roles available to that specific user, and provides a mechanism for the user to delegate authorities and roles to other users.

The system directory provides an additional layer of directory services that support the implementation of enterprise policy at the server level. Among other things, the system directory maintains and interacts with a database of roles that defines which users are allowed to take on particular enterprise roles (e.g., President), what authorities are available to those roles, and how those roles are presented external to the server. For example, the system directory could determine that a first employee attempting to send external e-mail representing herself as president was not entitled to exercise that authority. The user's text can make arbitrary claims (the user can claim to be president), however the authorization information attached by the authority server that sends the e-mail would identify the user's actual role, in an authenticated way (e.g., cryptographically signed by the corporation's signing key for external audience).

In the preferred embodiment the operation of the system directory is coordinated by an authority server application, through which incoming and outgoing electronic communications are routed and, in conjunction with the directory, performs whatever additional communication/transaction processing is required. The additional processing can include generating letterhead or authoritative signatures, encrypting the message, decrypting the message, logging the message or issuing binding electronic documents.

The present invention also includes the method by which the authority server application processes incoming and outgoing communications in conjunction with the directory services. For example, in response to a request from an enterprise user to send external e-mail using standard employee letterhead to an external destination identified by nickname, the authority server determines, using the directory, the destination's e-mail name and key, then performs lookups into the role database with the system directory to determine whether the user was entitled to use that role (e.g., employee) and, if so, to determine the letterhead and cryptographic signature associated with that role. The authority server application then appends the letterhead and signature to the outgoing message and encrypts the resulting message with the key of the destination. The authority server application can also add to the message information about the authentication of the sender. The present invention processes incoming mail from the outside in a similar manner.

In an extension of the preferred embodiment, the authority server can assign authorities to an external user via a network. The user can then employ the authorities to access the server in the ways permitted by the authorities. This feature permits a company to grant to a customer needing technical help access to the server via a network and to allow the customer to obtain from the server authority to access relevant help files.

The preferred embodiment includes an information manager that enables each user, or system administrator, to update and maintain the role, key and address book information maintained in the server and to delegate and transfer authorities.

In an alternative embodiment, there are no directory services (i.e., each user/client maintains his own directory) but the server still performs all exercises of authority, including key management, encryption, decryption and signing, binding documents and attaching authorities and letterhead. This system is an improvement over the prior art due its support for centralized key management, ability to control the exercise of enterprise authorities, and need for dramatically fewer keys than a conventional PKI system.

Finally, the present invention defines an authority infrastructure incorporating a set of servers interconnected with secure links (e.g., shared key links, public key or wired links, etc.). An authority server has a set of clients that can include end user workstations and/or other authority servers. Each authority server embodies at least a subset of the authorities associated with a common entity and enables its clients to make use of those authorities if permitted by policies of the common entity about which the authority server is aware. For example, authorities might include the right to sign communications using a company's private key, encrypt communications with a recipient's public key, use corporate letterhead indicating the user's office, issue an insurance binder or ship an order. In the preferred authority infrastructure, users and other servers are assigned roles that are associated in the policies with rights to direct certain authorities. By distributing policy-based decision making according to principles of subsidiarity (distributing authority to the lowest, or optimum, level), local authorities can be implemented efficiently without the need to relay each request to wield an authority from a user to a low level server (e.g., a department server) to a high level server (e.g., a corporate server). This authority infrastructure provides a significant advantage over the conventional PKI in the area of key management issues. That is, rather than maintaining key information for users at a plurality of sites, including a private key on their local server and public keys on other servers, all authorized processing for a group of users can occur at their local server in accordance with the policies implemented by the local server.

After handling a request the local server passes the request on to its parent server, which processes the request in accordance with its policies and the authority available at that level to the local server. In this system there may be user key pairs, but they are pairs shared between a user and his server, not a user and everyone he communicates with. Thus the key management problem is largely eliminated; the only keys that need to be managed for each user are the keys that secure communication with the local authority server. The local authority server then manages the key pairs for all local and external correspondents. In this way authorities can be distributed across a secure network of servers and the need for widespread key management is almost entirely eliminated.

Similarly, authority can be distributed across corporate boundaries, with third-parties or other corporations able to invoke limited authority within the first corporation. For example, an authority server within the first corporation could allow an authority server (or client) within a second corporation to place a shipping order within agreed-upon constraints; the server within the second corporation could authorize payment, the first server could confirm the order and initiate shipment (if and only if the first server actually has that authority). All components of the transaction would be confidential, authenticated, and processed according to the policies of the two corporations.

BRIEF DESCRIPTION OF THE DRAWINGS

Additional objects and features of the invention will be more readily apparent from the following detailed description and appended claims when taken in conjunction with the drawings, in which:

FIG. 2A depicts representative e-mail data streams and key components of the server 102 of FIG. 1;

FIG. 2B depicts basic steps with which the server 102 processes outgoing e-mail from a local client 108 of FIG. 1;

FIG. 3 is a block diagram of some of the components stored in the memories of the server 102 and a client 108;

FIG. 6 is a block diagram showing details of a hypothetical set of enterprise policies 188.

DESCRIPTION OF THE PREFERRED EMBODIMENT

The present invention teaches an electronic communication system and associated techniques that provide support for:

the implementation of role-based enterprise policies for expressing and exercising enterprise authority, and the projection and transfer of those authorities over networks of communicating electronic systems.

With these features the present invention provides a scalable alternative to conventional PKI that is able to provide secure and reliable electronic communications for vast numbers of communities of users and a wide range of network applications. A high level view of the problem addressed by the present invention is now described in reference to FIG. 1.

Figure 1:
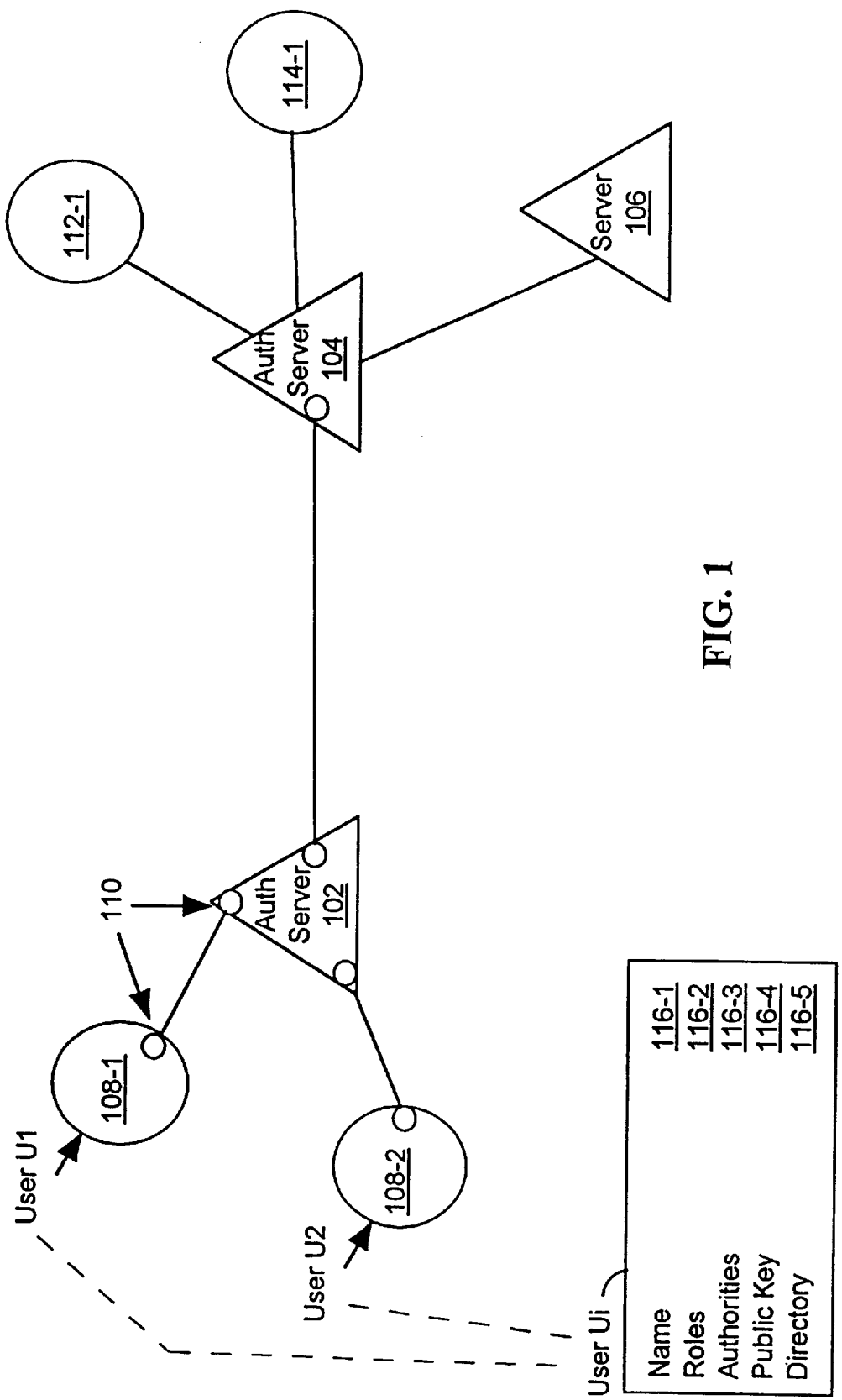
FIG. 1 is a block diagram of a network in which the communication system of the present invention can be implemented.

Referring to FIG. 1, there is shown a block diagram of a network in which the communication system of the present invention can be implemented. The network includes three communication servers 102, 104, 106, connected via respective electronic communications channels. For the purposes of the present discussion, at least the server 102 is an authority server that embodies the teachings of the present invention (i.e., the server 104 and its associated components can be conventional or implemented in accordance with the present invention). The servers 102, 104 represent corporate, or enterprise, servers (i.e., these servers have final responsibility for managing the external communications of their respective enterprises). Each of the servers 102, 104 can manage communications for other servers (e.g., the server 106) and/or clients 108-1, 108-2, 112-1, 114-1. Each client in turn provides end-user services for one or more users Ui. At least some of the servers and clients communicate through pairs of confidential and authenticated connections with endpoints 110, referred to hereinafter as portholes.

According to the present invention, each user Ui is associated in some way (e.g., as an employee, customer, or contractor) with the enterprise for which the corresponding enterprise server 102 wields final communications responsibility. Each user Ui of a server implemented in accordance with the present invention has associated user information 116, including one or more of:

a name or other identifier 116-1 for the user Ui;

roles 116-2 held by the user Ui within the enterprise (e.g., president, CFO, CTO);

corporate authorities 116-3 that the user Ui is permitted to wield (authority can be implied by the roles 116-2 and/or explicitly assigned);

a key 116-4, an identifier by which the server 102 can uniquely designate and know the user Ui;

a directory 116-5, which is a view of a system directory maintained by the server 102 that represents communication information relevant to the user Ui (e.g., nicknames of regular correspondents of and authorities wielded by the user Ui).

In the preferred embodiment the user information 116, authority information and policies/rules regarding how authority is wielded in the enterprise are closely held by the server and can only be initialized or changed in accordance with enterprise policy. For example, a particular enterprise might only allow select corporate officials to load information 116 for new users into the server 102 and might provide a detailed set of policies delineating how the roles 116-1 or authorities 116-3 of one user can be transferred or delegated to another user. Such control over user information is important as the reliability and security provided by the present invention results from close control over the external manifestation of enterprise roles 116-1 and authorities 116-3.

Another recommendation of the present invention is that reliable connections be provided between servers and clients (reliable in the sense of reliably delivering information to the intended recipient and no one else). In the embodiment of FIG. 1, these reliable connections are provided by portholes 110, each pair of which is configured to transfer communications between a respective server/client or server/server pair. For example, porthole pairs 110 exist between the server 102 and the client 108-1 and between the server 102 and the server 104. However, any system of providing secure network connections (e.g., encrypted links, hard wired connections, trusted connections) should be able to satisfy the security requirements of the present invention.

In a basic mode of operation of the system of FIG. 1, when a user Ui of the server 102 wishes to send an external communication including some manifestation of enterprise authority he first issues a request via an application running on a respective client 108 to the server 102. The server 102 determines whether the user Ui is entitled to exercise the requested authority and, if so, attaches a manifestation of that authority to the outgoing message. Only the server 102 is able to attach the manifestation; therefore, any external recipient, such as the server 104, is able to determine (if compatible with the present invention) that the user Ui legitimately exercised the manifested enterprise authority. This is but one example of the operation of the present invention; descriptions of many others will follow. Components of a preferred embodiment of the server is now described in reference to FIG. 2A.

Referring to FIG. 2A, there is shown a block diagram illustrating protocols implemented in and basic components provided by a preferred embodiment of the server 102 employed for e-mail communications. This particular embodiment of the server 102 is described because e-mail is the core electronic communications application. Application of the present invention to other problems, such as electronic commerce, workflow, issuing binding documents, etc. is similar to the e-mail case and therefore is not described at depth herein. As appropriate, comments will be made in the present document to highlight some aspects of the present invention that are most germane to the other problems. An absence of such comments directed to a particular problem should not be construed as limiting the intended application of the present invention, which is directed to all applications requiring the controlled electronic exercise of enterprise authority.

Referring to FIG. 2A, the server 102 is a computer with basic components (not shown), such as volatile memory (e.g., a RAM and a cache), non-volatile memory (e.g., a hard disk and flash memory) and a processor. The server 102 incorporates a directory service that can be thought of as including two principle components, a user directory 164 (DirUser) and a system directory 166 (DirSystem). This division of the directory service is not required by the present invention, but is merely illustrative of the operation of the directory service.

The user directory 164 provides for each user:

a list of the user's correspondents, whether internal or external, and a view of the enterprise roles and/or authorities, if any, of the user and the user's correspondents.

A key function of the user directory 164 is to map user references (e.g., nicknames) to external references (e.g., Internet e-mail addresses).

The system directory 166 provides lower level information on users and their correspondents, including: roles and authorities associated with users and/or the enterprise, addresses for users and their correspondents (internal or external), and representations/manifestation of the respective enterprise authorities (e.g., encryption and signing keys). Putting it another way, the system directory 166 provides a mapping from authority references (names, for example) to representations necessary to invoke that authority. These representations may include:

- objects provided by the implementation platform (Java objects, KeyKOS keys, etc.); and
- information used to represent that server's authorities to an appropriate third party, such as passwords to prove authorization to a password-controlled database.

Examples of information that can be used to project authority to outside services include:

- user name and password—to invoke a stored database procedure or log into a UNIX-based service;
- Kerberos tickets;
- symmetric keys (for encryption such as DES) shared with the destination;
- keys or certificates for standard public-key encryption;
- routing information (host, port number, routes, domain); and
- a procedure whose execution invokes the authority—for example, engaging in challenge/response authorization using some of the above information.

The system directory can also specify what cryptography type and key are to be used to verify information from a particular external correspondent or to encrypt information to particular external destination.

The server 102 also incorporates an authority application 154, which controls all exercise of enterprise authorities by the users Ui and coordinates all communications between the users Ui and their external correspondents. An important function of the authority application 154 is to implement enterprise policy regarding the exercise, transfer, delegation and projection of enterprise authority. For the purposes of the present invention, the authority application 154 is understood to encompass all applications that make use of or authorize the use of authorities. Such applications might, at a minimum, be used for e-mail, financial transactions, workflow applications, electronic sales, online insurance, database transactions, remote access to computing resources, and a variety of web-based transactions.

In the preferred embodiment the server 102 incorporates all functionality necessary to support e-mail communications. For example, assuming a conventional e-mail setup, the server 102 is configured to support incoming e-mail from clients in SMTP (Simple Mail Transfer Protocol), provide client/user directory services using LDAP (Lightweight Directory Access Protocol), issue outgoing mail to clients in IMAP (Internet Mail Access Protocol) or POP3 (Post Office Protocol-3) and communicate with external servers using SMTP. This is just one example of how the server 102 can be configured to support one particular electronic communications application (i.e., e-mail). Other configurations of the server 102 are also possible depending on the target communications application. These several functions are described in detail below and in general in reference to FIG. 2B.

Referring to FIG. 2B, there is shown a data flow diagram showing a basic e-mail transaction mediated by the authority application 154. In this simple e-mail transaction the authority application 154 is required to attach an indication to an outgoing e-mail message verifying to the outside world that the sender is affiliated with his employer, Big Corp. As the first step (2.1) in this transaction a user Ui issues incoming mail in SMTP that is routed through the authority application 154. The incoming mail will typically have a destination and source represented using user references (e.g., send to: Jane from: Buddy). The authority application 154 employs the user directory 164 to resolve (2.2) these user references to system references (e.g., send to: JaneS@Corp2.com from: BDomino at BigCorp.com). Given the user references, the authority application 154 consults the system directory 166 (2.3) to determine what representation of corporate authority, if any, to attach to the mail. This representation might be a private signing key that is applied to all external user email. The authority application 154 then attaches the appropriate representation and sends the mail out using SMTP (2.4).

Referring to FIG. 3, there is shown a block diagram of the programs and data structures stored in the memories 148, 208 of the server 102 and a representative client 108. The programs 150 stored in the server 102 include an operating system 152, the authority server 154, an SMTP host 156, an IMAP host 158, a POP3 host 160, cryptography systems 162, the user and system directory services 164, 166, the portholes 168 (corresponding to the portholes 110 shown in FIG. 1), policy applications 170, and an information manager 172.

In the conventional manner the programs 150 are executed by the server's processor (not shown) in the memory 148 under control of the operating system 152, which also provides system services for the executing programs 150. The SMTP, IMAP and POP3 hosts 156, 158, 160 are conventional and could be any programs that implement the required mail protocols for internal and external (i.e., Internet-based) users. Moreover, these programs 156, 158, 160 are representative of the larger class of communications programs, any of which could work in the context of the present invention.

The policy applications 170 have features that can only be directed by respective classes of users according to a set of corporate policies. These features can be as simple as attaching a signature line to an outgoing e-mail message or as complex as authorizing the wire transfer of millions of dollars. Such applications require the intercession of the authority application 154, which controls all exercises of enterprise authority; therefore, descriptions herein of the authority application 154 encompass such features of the policy applications 170. Typical policy applications 170 might include:

- an e-mail delivery/routing application;
- an insurance underwriting application;
- a database application;
- an online sales application;
- a technical help application;
- a financial application;
- a directory/name service application;
- an accounting application;
- a notary service; and
- a file server application.

The information manager 172 enables each user, or system administrators, to view, update and maintain the role, key and directory information maintained in the server and to delegate and transfer authorities. The user and system directory services 164, 166 have already been described in reference to FIG. 2 and are not further described as directory services are well known. What is unique about the user and system directories 164, 166 are the user and system references (partially embodied in the user directory information 194) and other information (e.g., keys and roles databases 182,186) they are configured to manage. These references and other information are described below.

The crypto systems 162 are also conventional. They can be implemented in any fashion and are presumed to be able to perform encryption and signing in any of the accepted forms. For example, in the preferred embodiment the crypto systems perform public key cryptography (e.g., PGP or S/MIME), shared key cryptography (e.g., DES) and is compatible with Internet security protocols, such as SSL. The crypto systems 162 are employed by the authority application 154 to encrypt, sign and decrypt documents; validate signatures and perform other crypto operations. Cryptography serves an important function in the present invention, which is to enable the authority server to attach indicia or manifestations of enterprise authority to electronic communications. That is, in a typical application of the present invention, which involves the authority application 154 issuing a document that manifests the enterprise's authority to an external correspondent on behalf of an enterprise user, the authority application 154 simply signs the document with a private key associated exclusively with the enterprise. Assuming they know the enterprise's public key, the correspondent will be assured that the document so signed carries the enterprise's authority.

Note that the present invention does not require cryptography to be used to convey manifestations of authority. In situations where there is a trusted connection between two corporate servers 102,104 and the servers trust one another, the authority application 154 need only attach some agreed signal representing the authority of the enterprise and send the document and signal in clear.

The data structures 180 include a keys database 182, optional roles and rules databases 186, 188, message/processing queues 190, user directory information 194 and low level connection information 192 necessary to authenticate the connections between a user Ui and the server 102. The low level information 192 might include a public key 116-4 for each user that is paired with a private key used by a client to send information between two respective portholes 110. No particular type of low level connection information 192 is required by the present invention.

The keys, roles and rules databases 182, 186, 188 and the user directory information 194 are key components of the present invention and, ironically, are also optional or of minimal size. The keys database 182 lists various roles/authorities associated with a particular enterprise and the manner in which manifestations of those authorities can be projected. The keys database 182 can be very small in the preferred embodiment, which associates keys not with individual roles but with servers and/or groups of users. For example, in response to a request by a user asking the authority application 154 to perform a particular communication or transaction, the authority application 154 determines the user's role and then processes the requested communication or transaction in accordance with enterprise policy for that role. The processing includes encrypting, signing, verifying, authorizing, completing the transaction and appending indications of the user's right to direct enterprise authority to the communication. The processing that includes cryptographic operations is performed by the server 102 with its keys, not those of users. For example, assume a scenario where a user asks the server to append to a communication electronic letterhead indicating the user's role (e.g., president). In response, the server verifies that the user is the president or the president's proxy, appends a signature line to the communication indicating the user's role and then signs the entire communication with the enterprise's private signing key, which provides a verifiable indication of the user's role with the enterprise. There is no need to hold such a key in a keys database 182. Alternatively, the authority application 154 might only sign the signature line with the enterprise's private signing key and send the message in clear or encrypted with the recipient's public key. Assuming secure communications links, this embodiment enables the indirect exercise of enterprise authority and dramatically reduces the key proliferation that is an unavoidable problem of conventional PKI.

The roles database 186 defines what roles enterprise users can take and explicit and implicit authorities that are associated with those roles. The roles database 186 is optional as the present invention is applicable to the situation where each person authorized to act for an enterprise has equal status and therefore there is no point distinguishing between roles. The roles database 186 is useful when different persons and roles within the enterprise have different levels of authority. For example, it would be very unlikely for a junior engineer to be given check signing authority, whereas such authority and much more would naturally reside in the president. The rules database 188 embodies enterprise policy on who can direct the exercise of enterprise authority and how the enterprise authority is to be manifested. Rules included in the rules database 188 govern, among other things:

1) which authorities are implied by particular roles when such roles are not explicitly defined in the roles database 186 (e.g., the president can exercise all enterprise authority except for the authority required to update the rules, roles and keys databases);

2) how documents are to be signed, binding documents issued, documents encrypted, etc.; and 3) enterprise policy on modifying, transferring, delegating or creating authority and its association with roles.

Like the keys 182 and roles 186, the rules 188 are optional. This is because, in some settings, the authority server will only perform the same rudimentary authentication procedures for all users (e.g., attach a signature line indicating the sender's role and sign the entire communication with the server's private signing key). The databases 182, 186 and 194 are described in greater detail in reference to FIG. 4.

The client memory 208 includes programs 210 and data structures 230. The programs include an operating system 212, an SMTP client 214, an IMAP client 216, a POP3 client 218, an optional cryptography system 220, porthole 222 (corresponding to one of the portholes 110 of FIG. 1), user applications 224 and, optionally, a local directory service 226.

In the conventional manner the programs 210 are executed by the client's processor (not shown) in the memory 208 under control of the operating system 212, which also provides system services for the executing programs 150. The SMTP, IMAP and POP3 clients 214, 216, 218 are conventional and could be any programs that implement the required mail protocols for internal and external (i.e., Internet-based) users. The cryptography system 220 is optional and can be used in embodiments where the server does not provide cryptography or the server cryptographic functions have been distributed to the clients.

The user applications 224 include programs run by a user on the client 108, such as Web browsers, word processors, spreadsheets, personal information managers and e-mail programs. These applications 224 are typically the originators of requests that give rise to intervention by the authority application 154. The optional local directory service 226 is needed when directory services are not provided by the server 102; in such an embodiment the server 102 would still control all exercise of authority, but the client 108 would resolve user references to system references using the optional user directory information 238.

Figure 4:
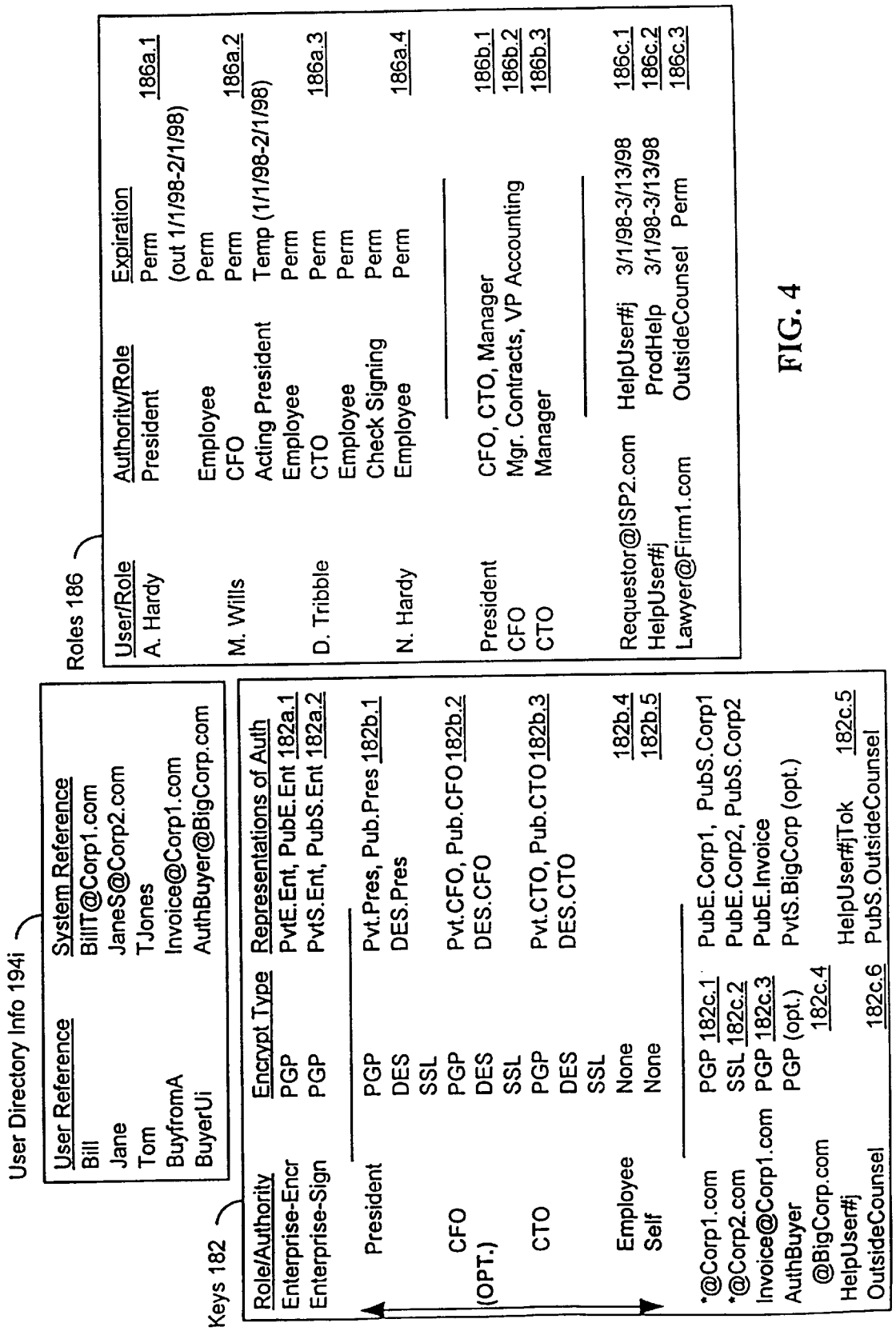
FIG. 4 is a block diagram showing additional details of the user directory information data structure, keys database and roles database stored in the memory of the server 102.

Referring to FIG. 4, there is shown a block diagram of instances of the user directory information data structure 194i for a particular user Ui, the keys database 182 and the roles database 186. As mentioned above, a user data structure 194i is provided for each user and is employed by the user directory service 164 to map user references to system references. The instance of the user data structure 194i shown in FIG. 4 includes names by which a user refers to external correspondents (Bill and Jane), internal correspondents (Tom) and corresponding system references (i.e., BillT@Corp1.com, JaneS@Corp2.com, and TJones, respectively).

The user directory information data structure 194i can also include user names for external destinations associated with some function of an external enterprise that the user has been authorized by that external enterprise to exercise. For example, the user directory information instance 194i includes the user reference, BuyfromA, and the corresponding the system reference, Invoice@Corp1.com. The BuyfromA user reference refers to authority granted to the user Ui by a corporation Corp1 to directly fill out and submit Corp1 invoices to buy products and/or services from Corp1. The user directory information instance 194i also includes an optional user reference BuyerUi that can be employed by the user Ui to issue BuyfromA requests. This reference maps to a system reference, AuthBuyer@BigCorp.com, that can be associated with any user from BigCorp authorized to issue invoices to outside suppliers. Thus, anytime the user Ui wants to buy from Corp1, all she needs to do is send a message to BuyfromA from BuyerUi. How this request is handled by the authority application is described in detail in conjunction with the description of the keys database 182.

The roles database 186 defines, among other things, mappings from:

users to roles;
users to authorities;
roles to other roles; and
roles to authorities.

The roles database 186 also defines the term or date of expiration of the defined mappings. In the present invention specific users can have one or more defined roles within the enterprise, each of which is associated with other roles and/or particular authorities, explicitly or implicitly. FIG. 4 shows an instance of the roles database 186 for a hypothetical enterprise. Mappings from user names to roles/authorities are shown in the upper portion 186a and mappings from roles to roles/authorities are shown in the middle portion 186b. For clarity, mappings from external users and/or roles to internal roles and/or authorities are shown in the lower portion 186c.

Referring to the top section 186a, the entry 186a.1 shows that the user A. Hardy permanently fills the roles of President and Employee but is unavailable to perform those duties from Jan. 1, 1998 to Feb. 1, 1998. According to the entry 186a.2, the user M. Wills permanently fills the roles of CFO and Employee, and briefly (from Jan. 1, 1998 to Feb. 1, 1998), the Acting President role. The entry 186a.3 shows that the user D. Tribble permanently fills the roles of CTO (Chief Technical Officer) and Employee and also permanently holds Check Signing authority. Finally, the entry 186a.4 shows that the user N. Hardy permanently fills the role of Employee and no other role.

Entry 186b.1 of the middle portion 186b of the roles database shows that the President is authorized to fill other enterprise roles and to exercise other enterprise authorities, including CFO, CTO and Manager. For example, if the rules database 188 required that the Manager of Accounting were the only person who could authorize a particular expenditure, the President could also authorize that expenditure. Moreover, because she is explicitly allowed to play the role of Employee, the President could issue a request to the authority application 154 to send mail for her as a simple Employee of BigCorp. Note that the range of Presidential authority and roles could also be defined in the rules database 188. The entry 186b.2 also shows that the CFO can fill the roles of Manager of Contracts or the VP of Accounting. This would, e.g., allow the CFO to represent herself as or exercise the authorities allotted to the Manger of Accounting. Similarly, entry 186b.3 shows that the CTO can exercise the authorities of Manager in addition to those associated with the CTO role.

So far, only roles and authorities of internal users (e.g., users of the system managed by an authority server) have been described. In the present invention roles and authorities can also be assigned to external parties. Roles and associated authorities assigned to such external users are shown in the lower portion 186c of the roles table. For example, the authority application 154 could allocate to a customer (e.g., Requestor@ISP2.com) a role (e.g., HelpUser#j) associated with the authority to access help files (e.g., ProdHelp) stored on the server 102. The authority application could define a limited time window (e.g., Mar. 1, 1998–Mar. 13, 1998) when the granted authority would be valid. This information is represented in the entries 186c.1 and 186c.2. In particular, the first entry 186c.1 defines the mapping from the external user's address (Requestor@ISP2.com) to the role (HelpUser#j) and the term of the mapping (Mar. 1, 1998–Mar. 13, 1998) and the second entry 186c.2 defines the mapping from the role (HelpUser#j) to the authority (ProdHelp). The authorities application 154 could also generate a unique manifestation or token of the role (e.g., HelpUser#jTok) that the customer would be required to show before the authorities application 154 would grant access to the help files. This token could be a password, an object (a Java object, KeyKOS key, etc.) or any other kind of token trusted by the enterprise. The authorities application 154 would issue this token to the customer and record the same token in the keys database 182, which is described below. This arrangement would enable the authority application 154 to closely control access to internal files by assigning multiple users of the same ProdHelp files different assigned roles, each with appropriate expiration dates. For example, by simply deleting the HelpUser#j entry from the keys table 182 the authority server 154 would effectively revoke the access for Requestor@ISP2.com while leaving intact the right to access the same files of another user (not shown).

The roles database 186 could also include outside consultants (such as lawyers and accountants) who provide services to the enterprise. Such suppliers might simply evidence their enterprise authority by signing all transmissions with a private signature key whose public signature counterpart would be recorded by the authority server 154 in the keys database. Upon receiving such a transmission the authority server 154 would simply decrypt and verify the signature. The roles database 186 shows an entry 186c.3 for one such consultant (Lawyer1@Firm.com) with permanent Outside Counsel authority.

These descriptions of the roles database 186 have covered only a few of the ways roles can be employed in the present invention and are not intended to limit the scope of the present invention. In fact, the present invention covers all representations of roles that are accounted for in enterprise communication policy implemented in an application, such as the authority application 154.

The keys database 182 specifies a mapping from a role or authority to representations of that role or authority. These representations can be used in a number of situations:

by an external user to indicate their authority to an authority server when making a request of the authority server to exercise an authority managed by the authority server; e.g., by an external user to access help files;

to convey to an external agency that a transmission from an internal user of the authority server is authorized by the enterprise; e.g., an e-mail sign-off verifying that a sender claiming to be President actually was President at the time the message was sent;

by one server within an enterprise to convey its authority to another server in the enterprise; e.g., a departmental server that needs to establish its authority with a corporate server to request a service for itself or one of its users.

An example of the keys database 182 is shown in FIG. 4 for the hypothetical enterprise whose roles database 186 has already been described. The keys database sets out for each role or authority (internal or external) a representation of that authority and an indication of how that authority is to be used (e.g., if the representation is an encryption key, which encryption technology it is associated with). The keys database 182 is shown in three portions 182a, 182b and 182c.

The top portion 182a shows the authority representations employed in the preferred embodiment to certify internal users to the outside world. In the preferred embodiment the authority application 154 certifies communications for internal users using keys that are associated with the enterprise as a whole, not individual users or roles. This arrangement greatly reduces the complexity of key management that results from each enterprise user having their own keys pairs, as in the conventional PKI, and is therefore highly scalable. Thus, the authority, Enterprise-Encr 182a.1, is associated with PGP (or S/MIME) public and private encryption keys (PubE.Ent, PvtE.Ent) used by the authority application 154 to decrypt and encrypt communications involving authorized users. Similarly, the authority, Enterprise-Sign 182a.2, is associated with PGP (or S/MIME) public and private signing keys (PubS.Ent, PvtS.Ent) used to sign and/or verify communications involving authorized users. For example, whether requested to send an e-mail message for the President or an Employee, the authority application 154 can certify to another server (e.g., the server 104, FIG. 1) that the sender is who they claim to be by signing the message with the PvtS.Ent key/representation. This scenario assumes that the receiving server 104 knows the corresponding public key PubS.Ent needed to decrypt and verify the signed message.

Note that the present invention does not require the Enterprise authorities 182a.1 and 182a.2 to have encrypted representations. It might be adequate, for example, between two servers that trust each other from different enterprises, that the only authentication of sender ID needed is an attachment to all communications sent in the clear over their secure connection indicating to the other server that the sender has been authorized under enterprise policy to send the communication. This authentication could be implemented in many forms not described herein. Moreover, the Enterprise authorities and all other authorities can be represented in any conceivable method, as already described.

The middle portion 182b shows the authority representations employed in an alternative embodiment to certify internal users to the outside world. In the alternative embodiment the authority application 154 certifies communications for internal users using keys that are associated with particular roles and/or users. Thus, the authority representation 182b.1 for the President can include PGP encryption signature keys Pvt.Pres, Pub.Pres, a DES key Pub.Pres and an indication that the server 102 is allowed to enable a SSL connection on behalf of the President. The use of any of these representations 182b.1 depends on the authority application 154 first verifying that any user attempting to wield the President's authority is so-authorized in the roles database 186. The middle portion 182b shows similar role-specific representations for the CFO 182b.2 and the CTO 182b.2 and group representations for users representing themselves as Employees 182b.3 and as themselves. Note that in the illustrated arrangement there is no encrypted representation of user authority. In this case, the representation for a given Sender might be an attachment generated by the authority server, such as:

From the desk of Sender, an employee of BigCorp (when a user sends mail as Employee); or From Sender, (when a user sends mail as Self).

Both sections 182a and 182b could be used in an application supporting both types of representation, although the alternative representation 182 increases key management complexity considerably. However, even with its additional complexity, the alternative representation 182 possesses advantages over conventional PKI as authorization, key management and secure communications are all handled centrally, by the authority server 154. This is not the case in conventional PKI systems, in which some of these duties are distributed.

The lower portion 182c shows representations/tokens of enterprise authority that have been received from outside enterprises. For example, assuming that all communications involving users at Corp1 are decrypted and/or signed with enterprise keys (i.e., signed by Corp1 with the private Corp1 signing key and decrypted by Corp1 with the private Corp1 encryption key), the corresponding public keys would be stored in the keys database 182. This is represented in the FIG. 4 entry 182c. 1, which shows that mail to or from all users at Corp1 (*@Corp1.com) can be encrypted or verified with the public keys, PubE.Corp1 or PubS.Corp1. As with the internal users, the present invention is configured to handle practically any kind of security mechanism required by outside enterprises. Thus, the keys database entry 182c.2 shows that all communications with users at Corp2 are to be conducted according to the SSL protocol.

The authority for the user Ui granted by Corp1 to fill out Corp1 invoices is also memorialized in the keys database 182. This authority is represented in entry 182c.3, which shows that all invocations of the authority Invoice@Corp1.com (i.e., messages sent to that e-mail address) must be encrypted with the PGP public key PubE.Invoice. Similarly, the keys database 182 could hold a signature key PvtS.BigCorp 182c.4 used by all approved buyers from BigCorp (AuthBuyer@BigCorp.com). Thus, if an internal user Ui issued a request to send a filled-out invoice to: BuyfromA from: AuthBuyer, the authority application 154 would:

1) sign the invoice with the private signing key PVtS.BigCorp,
2) encrypt the result with the public encryption key PubS.Corp1, and
3) send the final version of the request to: Invoice@Corp1.com from: AuthBuyer@BigCorp.

The lower portion 182c also shows representation/tokens of enterprise authority that are distributed to outside users. For example, the limited authority given to a customer for the purpose of accessing particular help files is represented in the entry 182c.5. This entry indicates that the role of HelpUser#j (refer to discussion of the roles database 186) can only be invoked with the token HelpUser#jTok. Per the roles database 186, this role is only active from Mar. 1, 1998 to Mar. 13, 1998. As a result, this token HelpUser#jTok is only enabled by key management functions within the authority server 154 between Mar. 1, 1998 and Mar. 13, 1998. The lower portion 182c also includes an entry 182c.6 indicating the public signature key PubS.OutsideCounsel that is used to verify that every communication attributed to outside counsel is actually from outside counsel. The involvement of the authority application 154 in an electronic communication from an internal user to an external user is now described in reference to FIG. 5.

Figure 5:
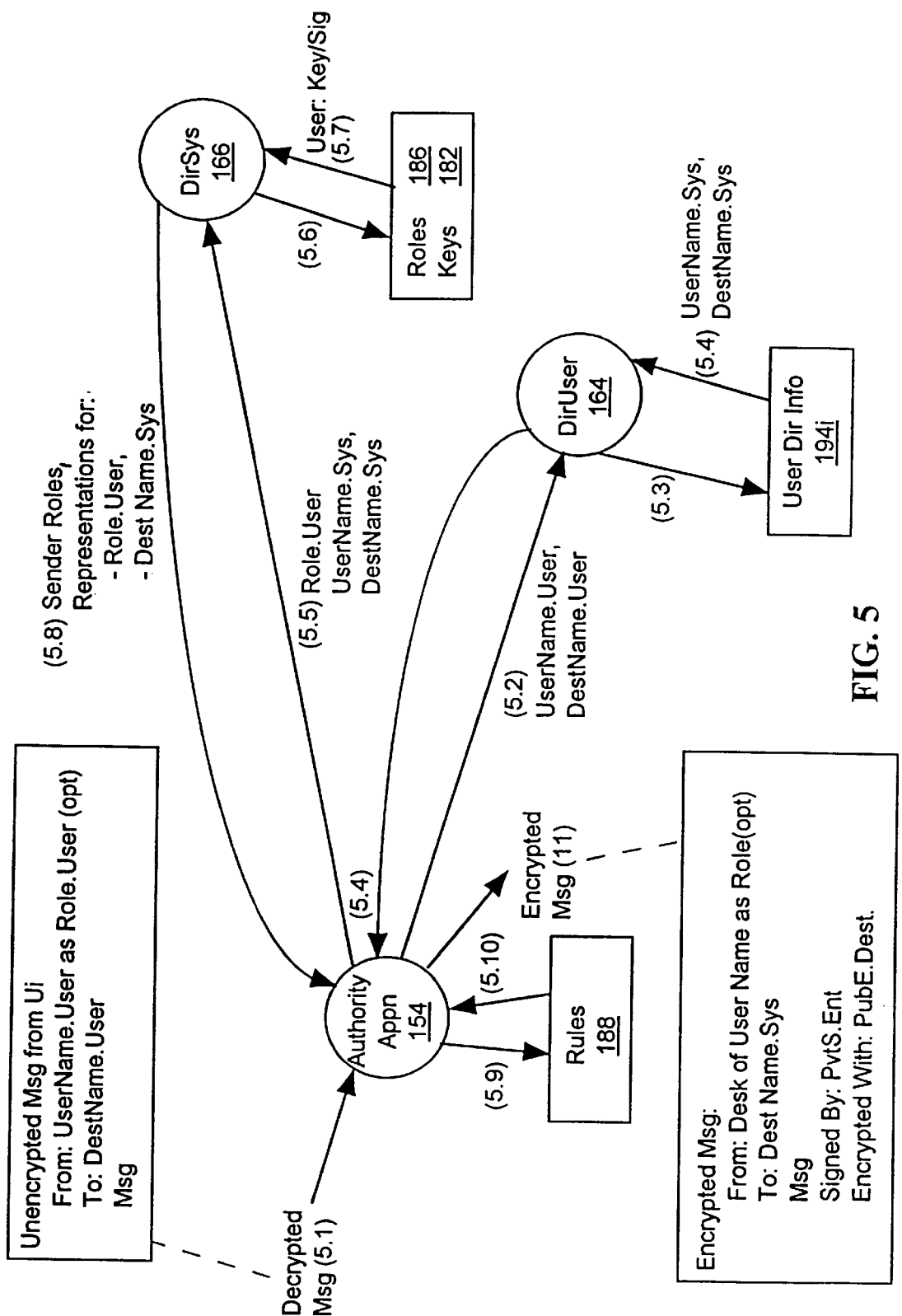
FIG. 5 is a data flow diagram showing details of the steps by which the authority server application 154 processes outgoing e-mail from a local client 108.

Referring to FIG. 5, there is shown a data flow diagram illustrating operations performed or initiated by the authority application 154 for an e-mail communication between an internal user of the server 102 and an external user (e.g., of the server 104). The order of operations is indicated by reference numbers (e.g., 5.1) shown above arrows indicating an operation or flow of information. This illustration is directed to a very simple application where the authority application 154 attaches verified letterhead to an outgoing e-mail communication. However, in light of the preceding discussions and the general principles embodied in this application, it should be clear that the present invention is applicable to many more complex applications of electronic commerce, already mentioned.

As the first step (5.1) a user sends an unencrypted message to the server 102 of the form:

FROM: UserName.User as Role.User

TO: DestName.User Msg.

In this simplified message format UserName.User and DestName.User are user references for the message sender and recipient and Role.User designates a user reference to the enterprise Role by which the user wishes to send the message. For example, the UserName. User might be Ann_Hardy, the Role.User Pres, and the DestName.User Bill. The Msg field represents the Message Text. Recall that the server 102 is assumed to have verified that the user is who they say they are using the portholes 110 (FIG. 1). This low level verification is not within the scope of the present application to describe.

The authority application 154 next issues one or more requests to the user directory 164 to return system references for UserName.User, DestName.User and, possibly Role.User (5.2). The user directory complies by consulting (5.3) the user directory info 194i for the user sending the message and returns, if possible, corresponding system references UserName.Sys, DestName.Sys and Role.User (5.4). Given the preceding example, as a result of this step the authority application 154 would know the sender (Ann_Hardy) and recipient (Bill) correspond to the system references AHardy and BillT@Corp1.com and that Role.User corresponds to the system reference President.

Assuming the user directory 164 was able to return valid system references, the authority application 154 issues one or more requests (5.5) asking the system directory 166 to return:

1) the roles that can be filled by the sender UserName.Sys;
2) representations of authority associated with the role Role.Sys; and
3) representations of authority associated with the role associated with the recipient DestName.Sys.

The system directory 166 satisfies these one or more requests using information in the keys and roles databases 182, 186 (5.6, 5.7). Note that these requests are not necessarily issued contiguously or in this order. Such ordering is a function of the organization and capabilities of the authority application 154, the directory services and the underlying operating system.

The system directory 166 determines the roles of UserName.User using the roles database 186. The system directory 166 determines the authority representations of the role Role.Sys using the keys database 182. The system directory 166 determines the authority representations of the recipient DestName.Sys by first determining the role (if one exists) of DestName.Sys from the roles database and then determining the authority representation for that role (or DestName.Sys, if no role) from the keys database 182.

In the preceding example, the system directory 166 would return in step (5.8) the following information:

User Roles: President, Employee

Representations for User: PGP Sign (PvtS.Ent)

Representations for Sender: PGP Encrypt (PubE.Corp1).

Once it has this information the authority application applies enterprise policy embodied in the rules database 188 to the requested communication (5.9, 5.10). Using the rules database, the authority application 154 will determine, among other things:

1) Whether the role Role.Sys is one of the roles the sender UserName.Sys is authorized to play;
2) Whether the request complies with enterprise system policy regarding what users of the role Role.Sys are allowed to do;
3) Representations that must be applied to the outgoing message in some manner for both the sender UserName.Sys and the receiver DestName.Sys; and
4) How to format the outgoing message so all representations are able to be interpreted by the destination server.

The authority application 154, once it has completed these operations, encrypts with the destination public encryption key or otherwise generates the outgoing message and then sends it to an outgoing message queue for transmission to the destination server. The destination server decrypts the resulting transmission with its private enterprise decryption key or otherwise interprets the message For example, if the transmission were signed with the sender's private enterprise signing key, the destination server would verify the sender with the sender's public signing key.

In particular, for the given message example (i.e., the message from AHardy as President to BillT@Corp1.com), the authority application 154 of the preferred embodiment would perform the following rules-based processing:

1) Determine whether the sender AHardy holds the position of President on the date the message is being sent (referring to the roles database 186 of FIG. 4, the answer is TRUE);
2) Determine in conjunction with rules database 188 whether the President can exercise the requested authority—i.e., to send an authenticated e-mail message (referring to the roles database 186 of FIG. 4, because the President can fill many roles and exercise many authorities, even if the rules database 188 denies the President the right to exercise e-mail authority as such, the President would still be able to exercise that authority indirectly);

IF the results of tests 1) and 2) are TRUE:

3) Determine the steps needed to process the e-mail request (In the preferred embodiment this is simply a matter of determining which representations need to made in the outgoing mail and issuing the mail with those representations);

4) Determine the authority associated with the recipient BillT@Corp1.com (referring to the Keys database 182 of FIG. 4, this authority is *@Corp1.com, which is associated with all external users who are employees of Corp1);

5) Determine the possible representations of the President role (referring to the Keys database 182 of FIG. 4, in the preferred embodiment, there is one possible representation, the private signing key PvtS.Ent, which is used by the authority application 154 to authenticate all messages for BigCorp enterprise employees or those acting for BigCorp);

6) Determine the possible representations of the *@Corp1.com authority role (referring to the Keys database example in FIG. 4, in the preferred embodiment, there is one possible representation, the public encryption key PubE.Corp1, which is used by the authority application 154 to encrypt all messages to employees of the Corp1 enterprise); and 7) Determine in accordance with the rules database 188 how to form the outgoing e-mail (in accordance with the rules database 188, the authority application 154 needs to generate BigCorp letterhead for the role of President, sign the message with the private signing key of the enterprise PvtS.Ent and encrypt the signed message with the public encryption key of Corp1 PubE.Corp1).

Note that in the encryption step 7) it is important that the methods of signing and encryption selected by the authority application 154 are supported by the recipient. This can be ensured by providing enterprise keys and/or key pairs in the keys database 182 for a wide range of cryptographic technologies. For example, in the preferred embodiment there could be enterprise keys for use with PGP, S/MIME and DES encryption systems. If this were the case, and given that Corp1's key is a PGP key, the authority application 154 would use the PGP enterprise keys. Similarly, if the outgoing message were to be sent to Corp2, which supports SSL encryption technology, the authority application 154 would use SSL signing and encryption techniques.

Referring to FIG. 6, there is shown a block diagram of a preferred embodiment of the rules database 188. The contents of the block diagram are merely exemplary and serve to indicate at least eight different types of rules that can be included in the rules database 188. These eight types of rules include:

(1) rules 202 on formatting/generating a communication (e.g., how to form letterhead used for general enterprise communications or for specific roles, such as President, CFO, etc.);

(2) signing/authorization rules 204 (e.g., The president can exercise Check Writing authority by herself but the CFO and CTO can only exercise Check Writing jointly);

(3) policies 206 regarding the execution of particular electronic transactions (e.g., the workflow steps required to issue an insurance binder, cut a check, pay a payroll, send e-mail, etc.);

(4) rules for encryption 208 (e.g., how to select the method of encryption, signing, decryption, or signature verification; the order of signing and/or encryption for outgoing mail or of decryption and signature verification for incoming mail);

(5) rules 210 governing the transfer and delegation of roles and authorities (e.g., roles can only be transferred by enterprise fiduciaries; roles can be delegated by the permanent occupant and enterprise fiduciaries);

(6) logging rules 212 (e.g., log any incoming message from a customer);

(7) monitoring rules 214 (e.g., monitor all activities by a user acting in another Role and send e-mail notifying the principal of that role of the other's activities); and (8) rules 216 governing the creation of keys and roles databases 182, 186 (e.g., only a fiduciary can create such databases if they can provide a secret key that is not available on the server 102).

Examples of the rules 210 governing the delegation and transfer of roles and authority can include at least five types of rules, including those regarding:

when a user can delegate at least a part of their authorities to another user (210*a*);

when a user can transfer the authorities of a second user to a third user (210*b*);

when a user can revoke or delegate at least a part of the authorities of another user (210*c*);

when a new user can be assigned one or more authorities (210*d*); and when a user can set delegation policies such that delegation of at least a part of their authorities occurs automatically under appropriate circumstances (210*e*); and when a user can create a limited version of an authority (210*f*) (the limited version of an authority can be at least one of: limited in time of applicability; limited by inclusion of additional properties, such as logging; limited by expiration; and limited by reduction in spending authority).

The rules 188 are highly flexible and can be implemented in any manner. Possible implementations include conditional statements in a conventional programming language—e.g., IF Role. Sys=President, THEN Letterhead= "From the Desk of the President";. Other possible representations include rules suitable for use in a forward or reverse-chained expert system, functional programming language (e.g., LISP) statements, or conditional statements written in a batch programming language, such as REXX or Java.

The rules database 188 and other databases 182, 186 are preferably created by only trusted parties, such as individuals with fiduciary duties to the corporation or individuals directly answerable to such parties. For example, enterprise policy might require that additions or changes to any of these databases (e.g., initial assignment of roles and authorities to users) can be read into the system only by such a trusted individual using special keys stored on a secure read-only memory, such as a CD-ROM or smart card, which is kept locked in a safe when it is not in use. Alternatively, initial assignment could be performed by a trusted remote service.

Figure 7:
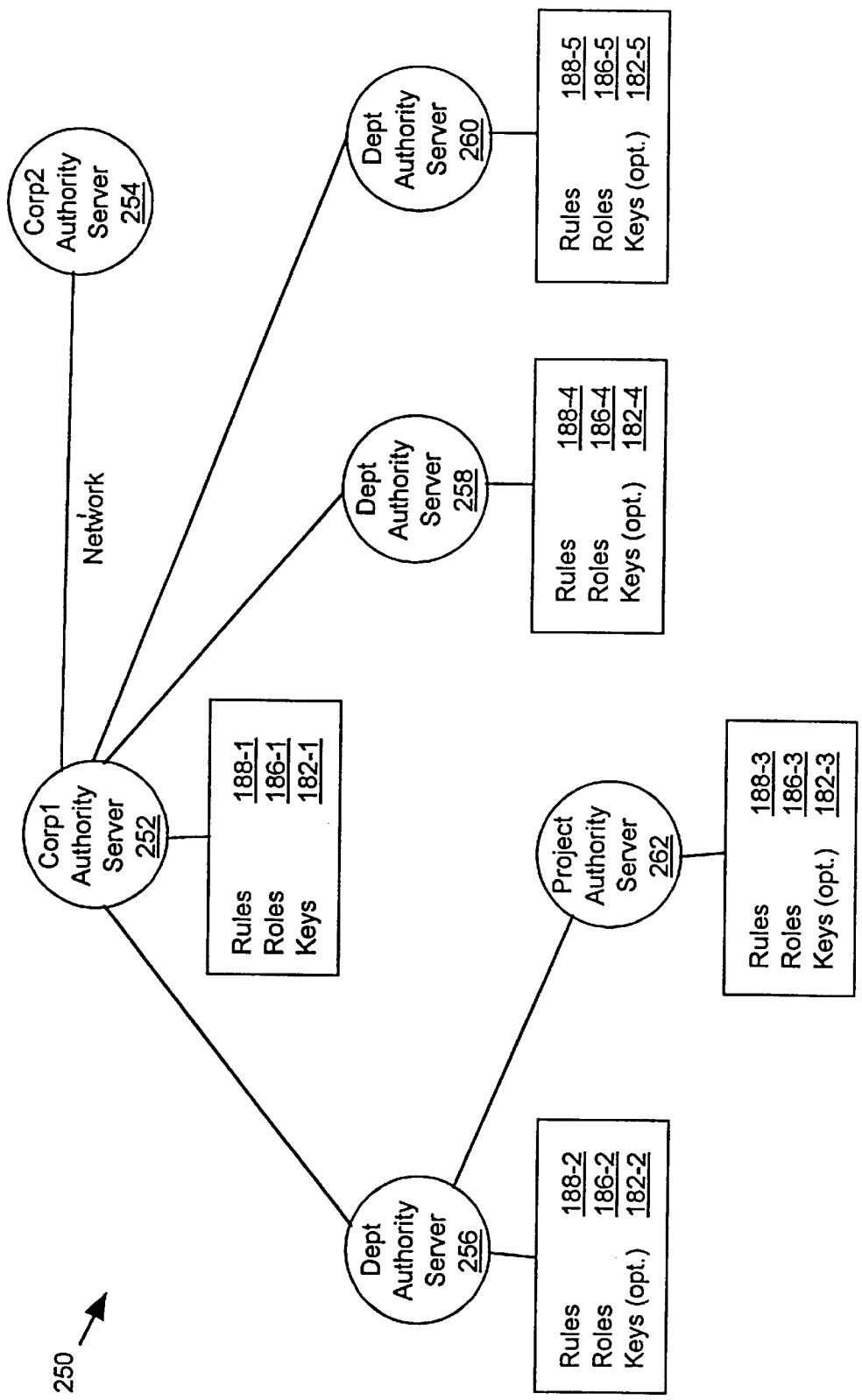
FIG. 7 is a block diagram of an enterprise authority infrastructure wherein enterprise authority is distributed among a plurality of authority servers.

Referring to FIG. 7, there is shown a block diagram of an alternative enterprise authority infrastructure 250 wherein enterprise authority is distributed among a plurality of authority servers. This system includes a corporate authority server 252 for Corp1 and a corporate authority server 252 for Corp2. These corporate authority servers are ultimately responsible for the exercise of authority by users and subsidiary authority servers associated with respective enterprises (e.g., Corp1 and Corp2). In particular, the corporate authority server 252 is directly connected to departmental authority servers 256, 258, 260, each of which controls the exercise of authority by its users and subsidiary authority servers. The departmental authority server 256 is in turn coupled to a project authority server 262, which controls the exercise of authority for its users. Each authority server includes an appropriate set of rules 188, roles 186 and keys. That is, the project authority server's databases 188-3, 186-2 and 182-1 are specifically configured for the set of users for which the project authority server 262 provides authority services. The same is true for each of the departmental authority servers 256, 258, 260 and, ultimately the corporate authority servers 252, 254.

In this architecture, requests by a lower level server to exercise authority are handled by an authority server at a higher level than the requester. These requests are evaluated based on the same principles described in reference to FIG. 5; that is, the type of requests, the roles assigned to the lower level server (registered in the higher level server's roles database 186), and the authorities associated with those roles (registered in the higher level server's roles database). Requests can be made on behalf of end users, or can be made by the lower level authority server for access to system resources controlled at a higher level. In some cases, a request can be relayed several levels above its originating server before it can be satisfied by a server that is entitled to exercise the necessary authority. Also, all responsibility for inter-enterprise transactions involving the projection and invocation of enterprise authority are managed by the corporate servers 252, 254. For example, the corporate server could sign all requests from any use or server within its scope with the same enterprise key.

Due to its distribution of authority processing, this architecture is highly scalable and facilitates the development of a complex system for controlling the exercise of enterprise authority from a set of relatively simple authority server components that are unaware of all other authority servers except their immediate parent and child server.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An authority server providing authority services for one or more users of one or more clients coupled to the authority server via secure connections, the one or more users being associated with a collective entity having a set of policies for the exercise of its authority, the authority services including allowing the users to indirectly exercise the authority of the collective entity through the authority server, the authority server comprising:

a processing unit;

a memory in which applications can be executed by the processing unit;

a policy application configured to execute in the server with features that can only be directed by respective classes of users according to the set of policies; and an authority application embodying the authority of the collective entity that is configured to respond to a request by a particular user of a particular class to direct a particular feature of the policy application by:

determining according to the set of policies and the particular class whether the particular user is allowed to direct the particular feature; and when the particular user is allowed to direct the particular feature, executing the particular feature using any user information provided by the particular user in the request and forming a manifestation of the execution incorporating the user information when provided.

2. The authority server of claim 1, wherein the authority application is further configured to apply a verifiable authority indication to the manifestation showing that the manifestation was formed with the authority of the collective entity.

3. The authority server of claim 2, wherein the verifiable authority indication is a signed manifestation formed by the authority application using a cryptographic key.

4. The authority server of claim 3, wherein the cryptographic key is selected from:

a private key; and a shared key.

5. The authority server of claim 3, wherein the cryptographic key is the same key for all users associated with an enterprise.

6. The authority server of claim 5, wherein:

the cryptographic key used for signing by the enterprise is a private signing key; and the cryptographic key used for decryption by the enterprise is a private decryption key.

7. The authority server of claim 2, wherein the authority application is further configured to attach a verifiable sender indication to the manifestation showing the identity/authority of the particular user who directed the execution of the particular feature and that the execution was approved by the authority application.

8. The authority server of claim 7, wherein the identity of the particular user comprises the particular class of the particular user.

9. The authority server of claim 7, wherein the verifiable sender indication comprises a signature line indicating the identity of the particular user signed by the authority server with a cryptographic key uniquely associated with the collective entity, the cryptographic key being accessible solely to the authority application.

10. The authority server of claim 9, wherein the cryptographic key is selected from:

a private key; and a shared key.

11. The authority server of claim 10, wherein the verifiable authority indication is a signed manifestation formed by the authority application using a cryptographic key.

12. The authority server of claim 1, wherein the policy application is chosen from a set of applications including:

an e-mail delivery/routing application;

an insurance underwriting application;

a database application;

an online sales application;

a customer help application;

a financial application;

a directory/name service application;

an accounting application;

a notary service; and a file server application.

13. The authority server of claim 12, wherein the authority application is further configured to:
   apply a verifiable authority indication to the manifestation showing that the manifestation was formed with the authority of the collective entity, and
   securely transmit the manifestation.

14. The authority server of claim 13, wherein the verifiable authority indication is a signed manifestation formed by the authority application using a cryptographic key.

15. The authority server of claim 1, wherein the authority application is further configured to perform at least one of:
   when permitted by the set of policies, allow a first user to delegate at least some of their authorities to a second user;
   when permitted by the set of policies, allow a third user to transfer at least some of the authorities of a fourth user to a fifth user;
   when permitted by the set of policies, allow a sixth user to revoke or delegate at least some of the authorities of a seventh user;
   when permitted by the set of policies, assign authorities to a new user;
   when permitted by the set of policies, allow a ninth user to set delegation policies such that delegation occurs automatically under appropriate circumstances; and
   when permitted by the set of policies, allow a tenth user to create a limited version of an authority.

16. The authority server of claim 15, wherein the limited version of an authority is at least one of:
   limited in time of applicability;
   limited by inclusion of additional properties, such as logging;
   limited by expiration; and
   limited by reduction in scope, such as reduced spending authority.

17. The authority server of claim 1, wherein initial assignment of the users to the classes is defined by a trusted official of the collective entity and thereafter is only modifiable according to the set of policies.

18. The authority server of claim 17, wherein the initial assignment is represented in a smart card that is read by the authority server and then removed from the server to a location under control of the trusted official.

19. The authority server of claim 17, wherein the initial assignment is performed by a trusted remote service.

20. The authority server of claim 1, wherein the set of policies encompasses tenets of capability security.

21. The authority server of claim 1, wherein each class of users is associated with a respective cryptographic key.

22. The authority server of claim 1, wherein each of the servers is associated with a respective cryptographic key.

23. The authority server of claim 1, wherein the particular user allowed to direct the set of policies comprises one or more users acting cooperatively.

24. An authority server infrastructure comprising:
   a set of authority servers, each particular authority server providing authority services for one or more users of one or more clients coupled to the particular authority server via secure connections, the particular authority server being associated with a collective entity having a set of policies for the exercise of its authority, the authority services including allowing the users to indirectly exercise the authority of the collective entity through the authority server;
   the set of authority servers being interconnected so that each particular authority server provides authority services only for its associated one or more users and any other servers connected as a collective client to the particular authority server;
   the particular authority server comprising:
      a processing unit;
      a memory in which applications can be executed by the processing unit;
      a policy application configured to execute in the server with features that can only be directed by respective classes of users according to the set of policies; and
      an authority application embodying the authority of the collective entity that is configured to respond to a request by a particular user of a particular class to direct a particular feature of the policy application by:
         determining according to the set of policies and the particular class whether the particular user is allowed to direct the particular feature; and
         when the particular user is allowed to direct the particular feature, executing the particular feature using any user information provided by the particular user in the request and forming a manifestation of the execution incorporating the user information when provided;
   such that each of the particular servers need not be aware of the set of policies and the one or more users of any other of the servers.

25. The authority server infrastructure of claim 23, wherein the authority application is further configured to apply a verifiable authority indication to the manifestation showing that the manifestation was formed with the authority of the collective entity.

26. The authority server of claim 24, wherein the verifiable authority indication is a signed manifestation formed by the authority application using a cryptographic key.

27. The authority server infrastructure of claim 25, wherein the cryptographic key is the same key for all users associated with an enterprise.

28. The authority server infrastructure of claim 27, wherein:
   the cryptographic key used for signing by the enterprise is a private signing key; and
   the cryptographic key used for decryption by the enterprise is a private decryption key.

29. The authority server infrastructure of claim 24, wherein the authority application is further configured to attach a verifiable sender indication to the manifestation showing the identity/authority of the particular user who directed the execution of the particular feature and that the execution was approved by the authority application.

30. The authority server infrastructure of claim 23, wherein the policy application is chosen from a set of applications including:
   an e-mail delivery/routing application;
   an insurance underwriting application;
   a database application;
   an online sales application;
   a customer help application;
   a corporate financial application;
   a directory/name service application;
   an accounting application;
   a notary service; and
   a file server application.

31. The authority server infrastructure of claim 30, wherein the authority application is further configured to:
apply a verifiable authority indication to the manifestation showing that the manifestation was formed with the authority of the collective entity, and
securely transmit the manifestation.

32. The authority server infrastructure of claim 24, wherein the authority application is further configured to perform at least one of:
when permitted by the set of policies, allow a first user to delegate at least some of their authorities to a second user;
when permitted by the set of policies, allow a third user to transfer at least some of the authorities of a fourth user to a fifth user;
when permitted by the set of policies, allow a sixth user to revoke or delegate at least some of the authorities of a seventh user;
when permitted by the set of policies, assign authorities to a new user;
when permitted by the set of policies, allow a ninth user to set delegation policies such that delegation occurs automatically under appropriate circumstances; and
when permitted by the set of policies, allow a tenth user to create a limited version of an authority.

33. The authority server infrastructure of claim 32, wherein the limited version of an authority is at least one of:
limited in time of applicability;
limited by inclusion of additional properties, such as logging;
limited by expiration; and
limited by reduction in scope, such as reduced spending authority.

34. The authority server infrastructure of claim 24, wherein initial assignment of the users to the classes is defined by a trusted official of the collective entity and thereafter is only modifiable according to the set of policies.

35. The authority server infrastructure of claim 34, wherein the initial assignment is represented in a secure read only memory that is read by the authority server and then removed from the server to a location under control of the trusted official.

36. The authority server infrastructure of claim 34, wherein the initial assignment is performed by a trusted remote service.

37. An authority server configured to manage electronic communications for one or more users of one or more clients coupled to the authority server via secure connections, the one or more users being associated with a collective entity, each of the users having at least one role with the collective entity, the authority server comprising:
an authority server program configured to process a particular communication associated with a particular user so that a selected one of the one or more roles of the particular user is authoritatively associated with a processed version of the communication generated by the authority server program.

38. The authority server of claim 37, further comprising:
a cryptographic key uniquely associated with the collective entity;
wherein the processed version includes a signature line indicating the selected role of the particular user signed with the cryptographic key; such that any recipient of the processed version who knows how to interpret the signature line is able to determine that the outgoing communication was sent by the particular user in the selected role with the collective entity.

39. The authority server of claim 37, further comprising:
a roles database accessible to the authority server program indicating which roles each of the one or more users is allowed to occupy within the collective entity;
such that, when the particular user indicates to the authority server program the selected role, the authority server is configured to verify in accordance with the roles database whether the selected role is included with the one or more roles associated with the particular user and, if so, to sign the processed version.

40. An authority server configured to manage electronic communications to and from one or more users of one or more local clients coupled to the server via trusted connections, the authority server comprising:
a keys database associating each of a plurality of roles with at least one cryptographic key; and
an authority server program configured to process a particular communication associated with a particular user in accordance with a trusted indication of the role of the particular user and information in the keys database associated with the particular user.

41. The authority server of claim 40, wherein the authority server is configured to process the particular communication using at least one action selected from:
signing the particular communication with an authorized signature key associated with the user's role;
appending to the particular communication letterhead authorized letterhead associated with the user's role;
encrypting the particular communication;
verifying the particular communication;
logging the particular communication; and
reporting the particular communication.

42. The authority server of claim 41, wherein, when the particular communication is an outgoing communication directed to an external destination, the action of signing the particular external communication comprises signing the particular communication with a private signing key associated with the particular user's role.

43. The authority server of claim 40, wherein, when the particular communication is an incoming communication directed to the particular user, the action of decrypting the particular communication comprises decrypting the particular communication with a private decryption associated with the user's role.

44. The authority server of claim 40, further comprising:
a user directory service that maps user names to internal addresses of respective clients used by the users and external destination names to external destination addresses; and
a system directory service that maps roles to keys and user names to roles;
wherein the authority server program is configured to employ the user directory and system directory services to resolve the identity and permitted roles of the particular user and the key information associated with those permitted roles.

45. The authority server of claim 44, further comprising:
a rules database that defines workflow procedures and authorized roles permitted to perform respective steps of the workflow procedures;
wherein the authority server program is configured to execute the workflow procedures as a collection of electronic communication actions in accordance with the rules database and the trusted indication of the roles of users required to participate in completion of the collection of electronic communication actions.

46. The authority server of claim 44, further comprising:

a user interface configured to enable authorized users to update information employed by the user and system directory services.

47. The authority server of claim 40, wherein the trusted connections are private and authenticated.

48. The authority server of claim 47, wherein the trusted connections are implemented using at least one of:

secure lines;

cryptographic techniques; and secure socket layer (SSL) technology.

49. The authority server of claim 40, wherein the electronic communications comprise external communications transmitted over a network of trusted servers including the authority server.

50. The authority server of claim 49, wherein the trusted connections are implemented using at least one of:

secure lines;

cryptographic techniques; and secure socket layer (SSL) technology.

51. An authority server configured to manage electronic communications to and from one or more users of the server who are associated with an enterprise, the authority server comprising:

a keys database associating one or more cryptographic key groups with the enterprise; and an authority server program configured to process a particular communication associated with a particular user in accordance with a trusted indication of the particular user's association with the enterprise and information in the keys database.

52. The authority server of claim 51, wherein the authority server is configured to process the particular communication using at least one action selected from:

signing the particular communication with a private signing key associated with the enterprise;

appending to the particular communication authorized letterhead associated with the user's role in the enterprise;

decrypting the particular communication with a private encryption key associated with the enterprise;

encrypting the particular communication with a public encryption key associated with a second enterprise associated with a sender of the particular communication;

verifying the particular communication;

logging the particular communication; and reporting the particular communication.

53. A computer program product configured to direct an authority server to manage electronic communications to and from one or more users of the server who are associated with an enterprise, the computer program product comprising:

a keys database associating one or more cryptographic key groups with the enterprise; and an authority server program configured to process a particular communication associated with a particular user in accordance with a trusted indication of the particular user's association with the enterprise and information in the keys database.

54. The computer program product of claim 51, wherein the authority server program is configured to process the particular communication using at least one action selected from:

signing the particular communication with a private signing key associated with the enterprise;

appending to the particular communication authorized letterhead associated with the user's role in the enterprise;

encrypting the particular communication with a public encryption key associated with a second enterprise associated with the receiver of the particular communication;

decrypting the particular communication with a private encryption key associated with the enterprise;

verifying the particular communication;

logging the particular communication; and reporting the particular communication.

* * * * *